United States Patent Office 3,086,967
Patented Apr. 23, 1963

3,086,967
METAL-CONTAINING AZO DYESTUFFS HAVING SULPHONYLOXY-SUBSTITUTED ALKYL SULPHONE GROUPS
Robert Ronald Davies and Cyril Eric Vellins, Manchester, England, assignors to Imperial Chemical Industries Limited, London, England, a corporation of Great Britain
No Drawing. Filed Nov. 23, 1959, Ser. No. 854,583
Claims priority, application Great Britain Dec. 5, 1958
1 Claim. (Cl. 260—145)

This invention relates to new azo dyestuffs and more particularly it relates to new metallised azo dyestuffs which are valuable for colouring wool and polyamide textile materials.

According to the invention there are provided the new metallised azo dyestuffs which, in the form of the free acids, are represented by the formula:

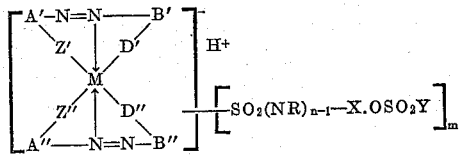

wherein A' and A'' each represent substituted or unsubstituted arylene radicals and may be the same or different, B' and B'' each represent the residues of substituted or unsubstituted coupling components which couple in the ortho or vicinal positions to D' and D'' respectively and B' and B'' may be the same or different, Z' and Z'' each represent —O— or —COO— and may be the same or different, D' and D'' each represent —O— or —NH— and may be the same or different, M represents a chromium or cobalt atom, R represents a hydrogen atom or a substituted or unsubstituted alkyl or aryl radical, X represents an alkylene radical, Y represents a substituted or unsubstituted alkyl or aryl radical, $n$ represents 1 or 2 and $m$ represents 1, 2, 3 or 4, provided that each of the groups [$SO_2(NR)_{n-1}$—X.$OSO_2$Y] is attached directly to a carbon atom present in A', A'', B' or B'' and that A', A'', B', B'', R, X and Y are free from sulphonic and carboxylic acid groups.

As examples of the unsubstituted arylene radicals represented by A' and A'' there may be mentioned monocyclic arylene such as phenylene and bicyclic arylene such as naphthylene and as examples of substituents which may be present in these arylene radicals and in the residues of the coupling components represented by B' and B'' there may be mentioned alkyl for example lower alkyl such as methyl, alkoxy for example lower alkoxy such as methoxy, chlorine, bromine, nitro, alkylsulphonyl for example methylsulphonyl and ethylsulphonyl, acylamine for example acetylamino, benzoylamino, carbomethoxyamino and carboethoxyamino, sulphamyl and substituted sulphamyl for example N:N-dimethylsulphamyl, N-ethylsulphamyl, N-benzoylsulphamyl and N-phenylsulphamyl.

The residues of the coupling components represented by B' and B'' are the residues of any coupling components which will couple in the ortho or adjacent position to a hydroxy or amino group, but B' and B'' are preferably the residues of phenols, naphthols, acylacetarylamides, 5-aminopyrazoles or 5-pyrazolones.

As examples of the substituted or unsubstituted alkyl or aryl radicals represented by Y there may be mentioned alkyl radicals for example lower alkyl radicals such as ethyl, propyl and butyl and preferably methyl, which may contain substituents such as a chlorine atom, and as examples of the aryl or substituted aryl radicals represented by Y there may be mentioned substituted and unsubstituted monocyclic aryl radicals such as phenyl, tolyl, chlorophenyl, methoxyphenyl and nitrophenyl.

As examples of the substituted or unsubstituted alkyl or aryl radicals represented by R there may be mentioned alkyl radicals for example lower alkyl radicals such as methyl, ethyl, propyl and butyl which may contain substituents such as hydroxy, methoxy, ethoxy and methane sulphonyloxy groups.

As examples of the alkylene radicals represented by X there may be mentioned alkylene radicals containing from 1 to 6 carbon atoms such as trimethylene, methylene, propylene, tetramethylene and α:β-dimethylethylene and preferably ethylene.

According to a further feature of the invention there is provided a process for the manufacture of the new metallised azo dyestuffs, as hereinbefore defined, which comprises treating a metallised azo compound which, in the form of its free acid, is represented by the formula:

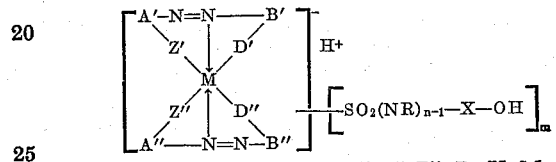

wherein A', A'', B', B'', D', D'', Z' Z'', R, X, M, $m$ and $n$ have the meanings stated above, with an acid halide of the formula Y.$SO_2$Q wherein Y has the meaning stated above, and Q represents a halogen atom.

This process of the invention may be conveniently brought about by treating a solution of the metallised azo compound in a basic solvent, for example pyridine, with the acid halide, preferably at a temperature between 0° and 35° C., adding water and filtering off the metallised azo dyestuff which is precipitated.

The treatment of the metallised azo compound with the acid halide may also be carried out in aqueous medium in the presence of an acid-binding agent, for example sodium carbonate, or the treatment may be carried out in an inert organic liquid, for example a hydrocarbon such as toluene, in the presence of an acid-binding agent or a basic organic liquid such as pyridine.

As examples of acid halides of the formula Y.$SO_2$Q which may be used in this process of the invention there may be mentioned methane sulphonyl bromide, ethane sulphonyl chloride, chloromethanesulphonyl chloride, benzene sulphonyl chloride, p-toluene sulphonyl chloride, propane α-sulphonyl chloride, propane β-sulphonyl chloride, β-methylpropane α'-sulphonyl chloride, p-chlorobenzene sulphonyl chloride, and m-nitrobenzene sulphonyl chloride, but the preferred acid halide is methane sulphonyl chloride.

The metallised azo compounds used in this process of the invention may be obtained by treating an azo compound of the formula:

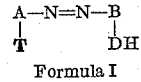

Formula I or two different azo compounds of the above formula, wherein A represents a substituted or unsubstituted arylene radical, B represents the residue of a substituted or unsubstituted coupling component which couples in the ortho or vicinal position to the group —DH, D represents —O— or —NH— and T represents a hydroxy, carboxy or alkoxy group which is attached to A in ortho position to the azo link, provided that A and B are free from sulphonic acid groups and carboxylic acid groups other than a carboxylic acid group represented by T, under mildly acid, neutral or alkaline conditions with an agent or agents yielding chromium or cobalt in such amounts that correspond to more than 0.5 atomic proportions of chromium or cobalt for each molecular proportion of the said azo compound, the azo compound or compounds being so chosen that the resulting metallised azo compound contains 1, 2, 3 or 4 groups of the formula $-SO_2(NR)_{n-1}-X-OH$, wherein R, X and n have the meanings stated above.

The azo compounds of Formula I may themselves be obtained by diazotising an amine of the formula:

wherein A has the meaning stated above and T represents a hydroxy, carboxy or alkoxy group which is attached to A in ortho position to the amino group, and coupling the diazo compounds so obtained respectively with a coupling component of the formula:

which couples in the ortho or vicinal position to the —DH group, the amine and the coupling component being so chosen that the resulting azo compounds contain 0, 1 or 2 groups of the formula $-SO_2(NR)_{n-1}-X-OH$ wherein R, X and n have the meanings stated above.

As examples of amines which may be used to obtain the azo compounds of Formula I there may be mentioned o-aminophenol, 4-chloro-2-aminophenol, 6-chloro-2-aminophenol, 4-, 5- or 6-nitro-2-aminophenol, 4:6-dinitro-2-aminophenol, 4-chloro-5-nitro-2-aminophenol, 2-aminophenol-4-sulphonamide, 2-aminophenol-5-sulphonamide, 2-aminophenol-4-sulphon-N-β-hydroxyethylamide, 2-aminophenol-4-sulphondimethylamide, 2-aminophenol-4-sulphonanilide, 2-aminophenol-4-sulphon-N-(3'-N-β-hydroxyethylsulphamylphenyl) amide, 2-aminophenol-4-methylsulphone, 2-aminophenol-4-ethylsulphone, 2-aminophenol-4-β-hydroxyethylsulphone, 2-aminophenol-5-β-hydroxyethyl sulphone, anthranilic acid, 4-chloroanthranilic acid, 5-nitroanthranilic acid, anthranilic acid 5-sulphon-N-β-hydroxyethylamide, anthranilic acid-4-sulphonamide, anthranilic acid-4-methylsulphone, anthranilic acid-4-β-hydroxy ethyl sulphone, 4-methoxy-2-aminophenol, 4-methyl-2-aminophenol, 2-aminophenol-4-sulphonmorpholide, o-anisidine, 4-, 5- or 6-nitro-2-anisidine, 4-, 5- or 6-chloro-2-anisidine, 2-aminophenol-4-sulphon-(N-methyl-N-β-hydroxyethyl)amide, 6-nitro-2-aminophenol-4-sulphon-N-β-hydroxyethylamide, 2-aminophenol-4-sulphon-N:N-di-(β-hydroxyethyl)amide and 6-nitro-1-amino-2-naphthol-4-sulphonamide.

As examples of coupling components which may be used to obtain the azo compounds of Formula I there may be mentioned 5-pyrazolones such as 1-phenyl-3-methyl-5-pyrazolone, 1-(2'-, 3'- or 4'-methylphenyl)-3-methyl-5-pyrazolone, 1-(2'-, 3'- or 4'-chlorophenyl)-3-methyl-5-pyrazolone, 1-(2'-, 3'- or 4'-N-β-hydroxyethylsulphamylphenyl)-3-methyl-5-pyrazolone, 1-(2'-, 3'- or 4'-β-hydroxyethylsulphonylphenyl)-3-methyl-5-pyrazolone, 1-(2'-, 3'- or 4'-sulphamylphenyl)-3-methyl-5-pyrazolone, 1-(2'-, 3'- or 4'-nitrophenyl)-3-methyl-5-pyrazolone, 3-methyl-5-pyrazolone, 1-phenyl-5-pyrazolone-3-carboxy-2'-methoxy-5'-methylanilide, 1-phenyl-5-pyrazolone-3-carboxyanilide, 1-phenyl-5-pyrazolone-3-carboxy-2'-toluidide, 1-(2':5'-dichlorophenyl)-3-methyl-5-pyrazolone, 1-(2'-methoxyphenyl)-3-methyl-5-pyrazolone, 1-(4'-sulphamylnaphthyl)-3-methyl-5-pyrazolone, 1-[3'- or 4'-(N:N-dimethylsulphamyl)phenyl]-3-methyl-5-pyrazolone, 1-[3'- or 4'-(N-methylsulphamyl)phenyl]-3-methyl-5-pyrazolone, 1-[3'-(N-phenyl-N-β-hydroxyethylsulphamyl)phenyl]-3-methyl-5-pyrazolone and 1:3-dimethyl-5-pyrazolone, 5-aminopyrazoles such as 1-phenyl-3-methyl-5-aminopyrazole, acylacetarylamides for example acetoacetarylides such as acetoactanilide, acetoacet-2-anisidide, acetoacet-4-anisidide, acetoacet-4-chloranilide and acetoacet-2-toluidide, phenols such as p-cresol, 2:4-dimethylphenol, 3:4-dimethylphenol, 2-acetylamino-4-methylphenol and 3-acetylamino-4-methylphenol and naphthols such as 1-benzoylamino-7-naphthol, 1-phenylamino-7-naphthol, 1-acetylamino-7-naphthol, 1-propionylamino-7-naphthol, 1-benzenesulphonylamino-7-naphthol, 1-carbomethoxyamino-7-naphthol, 1-carboethoxyamino-7-naphthol, 1-carboisopropoxyamino-7-naphthol, 2-naphthol, 2-naphthol-6-sulphon-N-β-hydroxyethylamide, 2-naphthol-6-β-hydroxyethylsulphone, 2-naphthol-6-sulphonanilide, 2-naphthol-6-sulphon-N-[4'-(N-β-hydroxyethylsulphamyl)phenyl]amide, 6-acetyl-2-naphthol, 6-bromo-2-naphthol, 1-naphthol-3-sulphonamide, 1-naphthol-4-sulphonamide, 1-naphthol-5-sulphonamide, 2-naphthol-6-sulphonamide, 4-acetyl-1-naphthol, 5-chloro-1-naphthol, 5:8-dichloro-1-naphthol, 5:6:7:8-tetrahydro-2-naphthol and 5:6:7:8-tetrahydro-2-naphthol-3-sulphonamide, amines such as 2-naphthylamine and 2-naphthylamine-6-sulphonamide and heterocyclic coupling components such as 2:4-dihydroxy quinoline, isoquinolinediol and barbituric acid.

According to a further feature of the invention there is provided an alternative process for the manufacture of the new metallised azo dyestuffs, as hereinbefore defined, which comprises treating 1 or 2 different metallisable azo compounds of the formula:

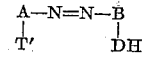

wherein A, B and D have the meanings stated above, and T' represents a hydroxy, carboxy, acyloxy or alkoxy group which is attached to A in ortho position to the azo link, with an agent or agents yielding chromium or cobalt the metallisable azo compound or compounds being so chosen that the resulting metallised azo dyestuff contains 1, 2, 3 or 4 groups of the formula

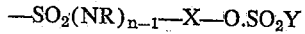

as hereinbefore defined.

The treatment of the metallisable azo compound or compounds with the agent or agents yielding chromium or cobalt is carried out under mildly acid, neutral or alkaline conditions, the amount of the agent or agents yielding chromium or cobalt used being such that corresponds to more than 0.5 atomic proportion, and preferably not more than 1.5 atomic proportions, of chromium or cobalt for each molecular proportion of the said metallisable azo compound or compounds.

As examples of the agents yielding chromium or cobalt which may be used in the alternative process of the invention there may be mentioned chromium or cobalt halides, for example the chlorides or fluorides, chromium or cobalt salts of aliphatic carboxylic acids, for example formic or acetic acid and mixtures of chromium or cobalt salts with alkali metal salts of aliphatic hydroxycarboxylic acids, for example of tartaric acid, chromium complexes of aromatic orthohydroxy carboxylic acids, for example salicylic acid.

The treatment of the said metallisable azo compound or compounds with the agent or agents yielding chromium or cobalt is carried out under mildly acid, neutral or alkaline conditions. The treatment may be conveniently carried out at elevated temperature under atmospheric pressures in aqueous medium preferably in the presence of an organic solvent, for example ethyl alcohol, n-butyl alcohol, β-ethoxyethanol, ethylene glycol or acetic acid. The formation of the metal complex may be facilitated by adding a wetting or dispersing agent to the reaction mixture. Upon completion of the reaction the metallised azo dyestuff is separated and, if desired in the case of those metallised azo dyestuffs which are soluble in water, may be purified by reprecipitating it, in the form of a salt from an aqueous alkaline solution, for example an aqueous solution rendered alkaline by the addition of sodium carbonate, sodium hydroxide, sodium phosphate or ammonium hydroxide.

The metallisable azo compound or compounds used in the alternative process of the invention may be obtained by treating 1 or 2 different azo compounds of Formula I which contain 1 or 2 groups of the formula $$-SO_2(NR)_{n-1}-X-OH$$

with an acid halide of the formula $Y.SO_2Q$, wherein R, X, n, Y and Q have the meanings stated above. When T and/or —DH in the azo compounds of Formula I represents a hydroxy group then it is believed that the acid halide also reacts with not more than one of these hydroxy groups to give an acyl group of the formula $-O.SO_2Y$, but this group is displaced during the treatment with the agent yielding chromium or cobalt in the alternative process of the invention.

Alternatively the metallisable azo compound or compounds used in the alternative process of the invention may be obtained by diazotising an amine of the formula:

wherein A has the meaning stated above and T' represents a hydroxy, carboxy, acyloxy or alkoxy group which is in ortho position to the amino group, and coupling the diazo compound with a coupling component of the formula:

as hereinbefore defined, the amine and coupling components being so chosen that the resulting metallisable azo compound contains 1 or 2 groups of the formula

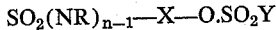

wherein R, X, Y and n have the meanings stated above.

As examples of amines containing 1 or 2 groups of the formula $-SO_2(NR)_{n-1}-X-O.SO_2Y$ as hereinbefore defined, which may be used to obtain the metallisable azo compounds used in the alternative process of the invention there may be mentioned 4- or 5-β-methane sulphonyloxyethylsulphonyl anthranilic acid and 2-methanesulphonyloxy - 5 - (β-methanesulphonyloxyethylsulphonyl) aniline.

As examples of coupling components containing 1 or 2 groups of the formula $-SO_2(NR)_{n-1}-X-O.SO_2Y$ as hereinbefore defined, which may be used to obtain the metallisable azo compounds used in the alternative process of the invention there may be mentioned 1-(3'- or 4'-β-methane sulphonyloxyethylsulphonylphenyl)-3-methyl-5-pyrazolone.

The new metallised azo dyestuffs, as hereinbefore defined, are of particular value for colouring nitrogen-containing textile materials for example textile materials comprising natural and regenerated protein fibres such as wool and silk, textile materials comprising synthetic nitrogen-containing fibres for example polyamide fibres such as fibres of polyhexamethyleneadipamide and the polymer of caprolactam, polyurethane fibres and polyacrylonitrile fibres especially modified polyacrylonitrile fibres. The new metallised azo dyestuffs can also be used for colouring leather.

The new metallised azo dyestuffs, as hereinbefore defined, can be applied to the textile materials by either a dyeing or a printing paste. For dyeing nitrogen-containing textile materials such as wool the new metallised azo dyestuffs are preferably applied to the said textile materials from a neutral, acid or slightly alkaline dyebath, preferably at temperatures between 75° and 120° C. If desired the dyebaths may also contain substances which are commonly added when dyeing nitrogen-containing textile materials such as wool, for example sodium sulphate, ammonium sulphate, acetic acid and formic acid. There may also be present in the dyebath anionic surface-active agents such as the disodium salt of methylene dinaphthalene sulphonic acid, non-ionic dispersing agents for example condensates of ethylene oxide with amines, fatty alcohols or alkylated phenols, and surface-active cationic agents for example quaternary ammonium salts such as cetyl trimethylammonium bromide, cetyl pyridinium bromide and stearamidomethyl pyridinium chloride. If it is desired to dye the nitrogen-containing textile materials at temperature below 75° C., for example at temperatures between 40° and 75° C. then it is preferred to add a water-soluble organic liquid, for example a water-soluble alcohol such as butanol or benzyl alcohol, to the dyebath.

Some of the new metallised azo dyestuffs of the invention have little or no solubility in water and in such cases it is preferred to use the dyestuffs in the form of an aqueous dispersion which may be obtained by milling the dyestuffs with water in the presence of a dispersing agent such as the disodium salt of methylene dinaphthalene sulphonic acid.

The new metallised azo dyestuffs of the invention have excellent affinity for nitrogen-containing textile materials, especially woollen textile materials, and the colourations so produced have excellent fastness to light and to wet treatments such as washing and in particular to milling, to potting and to acid cross dyeing.

A preferred class of the new metallised azo dyestuffs are those dyestuffs wherein n represents 1, so that each of the $-SO_2(NR)_{n-1}-X-O.SO_2Y$ group or groups present in the dyestuffs represents the group of the formula $-SO_2-X-O.SO_2Y$, since such dyestuffs give dyeings on wool which have better fastness to potting than the new metallised azo dyestuffs wherein n represents 2. In this preferred class of dyestuffs Y preferably represents a methyl radical which can optionally be substituted by a chlorine atom.

It is believed that the excellent fastness to wet treatments of the colourations obtained on textile materials from the new premetallised azo dyestuffs of the invention is due, at least in part, to a chemical reaction between the dyestuffs and groups such as hydroxy, mercapto or amino groups which are present in the textile materials. It is possible that this chemical reaction takes place by "alkylation" of the said group(s) with simultaneous formation of a sulphonic acid of the formula $Y-SO_2.OH$, wherein Y has the meaning stated above, just as methyl p-toluene sulphonate is known to be a methylating agent with simultaneous formation of p-toluenesulphonic acid.

The invention is illustrated but not limited by the following examples in which the parts and percentages are by weight:

*Example 1*

A mixture of 40.2 parts of the monoazo compound, which is obtained by coupling diazotised 2-aminophenol-4-β-hydroxyethyl sulphone with 1-phenyl-3-methyl-5-pyrazolone in the presence of sodium carbonate, 14.5 parts of chromium acetate and 500 parts of 50% aqueous alcohol is heated at the boil under a reflux condenser until metallisation of the monoazo compound is complete. The solution so obtained is poured into a 10% aqueous solution of sodium chloride and the metallised azo compound which is precipitated is filtered off and dried.

A mixture of 43.7 parts of the above metallised azo compound, 12.5 parts of methane sulphonyl chloride and 300 parts of pyridine is stirred for 5 hours at a temperature of between 0° and 5° C. The solution so obtained is poured onto a mixture of 200 parts of ice and 300 parts of water and 50 parts of sodium chloride are then added. The precipitated dyestuff is then filtered off and dried.

The new chromium-containing azo dyestuff so obtained when applied to wool from a neutral or weakly acid dyebath yields orange shades which have excellent fastness properties to washing, milling, potting, acid-cross dyeing, rubbing and to light.

*Example 2*

In place of the 43.7 parts of the metallised azo compound used in Example 1 there are used 54.4 parts of the metallised azo compound which is obtained by treating with an aqueous solution of chromium acetate the monoazo compound obtained by coupling diazotised 2-aminophenol-4-ethyl sulphone with 1-(4'-β-hydroxyethylsulphamylphenyl)-3-methyl-5-pyrazolone.

The new chromium-containing azo dyestuff so obtained when applied to wool from a neutral or weakly acid dyebath yields orange shades possessing excellent fastness to wet treatments and to light.

*Example 3*

In place of the 43.7 parts of the metallised azo compound used in Example 1 there are used 51.6 parts of the metallised azo compound which is obtained by treating with an aqueous solution of chromium acetate the monoazo compound obtained by coupling diazotized 2-aminophenol-4-methyl sulphone with 1-(4'-β-hydroxyethylsulphonylphenyl)-3-methyl-5-pyrazolone.

The new chromium-containing azo dyestuff so obtained when applied to wool from a neutral or weakly acid dyebath yields orange shades possessing excellent fastness to wet treatments and to light.

*Example 4*

In place of the 43.7 parts of the metallised azo compound used in Example 1 there are used 46.4 parts of the metallised azo compound which is obtained by treating with an aqueous solution of chromium acetate the monoazo compound obtained by coupling diazotised 2-aminophenol-4-β-hydroxyethyl sulphone with 1-acetylamino-7-naphthol.

The new chromium-containing azo dyestuff so obtained when applied to wool, silk and polyamide textile material from a neutral or weakly acid dyebath yields grey shades possessing excellent fastness to wet treatments and to light.

*Example 5*

In place of the 43.7 parts of the metallised azo compound used in Example 1 there are used 49.0 parts of the metallised azo compound which is obtained by treating with an aqueous solution of chromium acetate the monoazo compound obtained by coupling diazotised 2-aminophenol 4-β-hydroxyethyl sulphone with 1-carbethoxyamino-7-naphthol.

The new chromium containing azo dyestuff so obtained when applied to wool from a neutral or weakly acid dyebath yields grey shades possessing excellent fastness to wet treatments and to light.

*Example 6*

In place of the 43.7 parts of the metallised azo compound used in Example 1 there are used 28 parts of the metallised azo compound which is obtained by treating with an aqueous solution of chromium acetate the monoazo compound obtained by coupling diazotised 2-aminophenol - 4 - β - hydroxyethylsulphone with 1 - (3'-β-hydroxyethylsulphamylphenyl)-3-methyl-5-pyrazolone.

The new chromium-containing azo dyestuff so obtained when applied to wool from a neutral or weakly acid dyebath yields orange shades possessing excellent fastness to wet treatments and to light.

*Example 7*

In place of the 43.7 parts of the metallised azo compound used in Example 1 there are used 50 parts of the metallised azo compound which is obtained by treating with an aqueous solution of cobalt acetate the monoazo compound obtained by coupling diazotised 5-nitro-2-aminophenol with 1(4'-β-hydroxyethylsulphamylphenyl)-3-methyl-5-pyrazolone.

The new cobalt-containing azo dyestuff so obtained when applied from a neutral or weakly acid dyebath yields bordeaux shades possessing excellent fastness to wet treatments and to light.

*Example 8*

A mixture of 42.9 parts of the monoazo compound obtained by coupling diazotised 2-aminophenol-4-β-hydroxyethyl sulphone with 1-actylamino-7-naphthol, 25 parts of methane sulphonyl chloride and 200 parts of pyridine is stirred for 5 hours at a temperature of between 0° and 5° C. The solution so obtained is poured onto ice and the precipitated solid is filtered off, washed with water and dried. The solid so obtained is dissolved in 300 parts of ethanol, 132 parts of an aqueous solution of sodium/potassium chromosalicylate (which is obtained as described in Example 2 of British specification No. 787,305) are added and the mixture is stirred at the boil under a reflux condenser for 2 hours. The solution so obtained is poured into 150 parts of a 20% aqeous solution of sodium chloride and the dyestuff which is precipitated is filtered off and dried. The chromium-containing azo dyestuff so obtained is identical with the dyestuff obtained as described in Example 4.

The following table gives further examples of the new metallised azo dyestuffs of the invention which are obtained by the methods described in Examples 1 to 8 except that the monoazo compounds used in these examples are replaced by an equivalent amount of the monoazo compounds used in these examples are replaced by an equivalent amount of the monoazo compound which is obtained by diazotising the amine listed in the second column of the table and coupling with the coupling component listed in the third column of the table. The fourth column of the table lists the metal (chromium or cobalt) which is present in the dyestuff, and the fifth column of the table gives the shade obtained when the dyestuff is applied to a woolen textile material.

| Ex. | Amine | Coupling component | Metal | Shade obtained on woolen textile materials |
|---|---|---|---|---|
| 9 | 2-aminophenol-4-β-hydroxyethyl sulphone | 1-phenyl-5-pyrazolone-3-carboxy-m-chloranilide | Chromium | Red. |
| 10 | do | 1-phenylamino-7-naphthol | Cobalt | Olive. |
| 11 | do | p-Cresol | do | Reddish-brown. |
| 12 | 4-chloro-2-aminophenol | 1-(3'-β-hydroxyethylsulphonyl-phenyl)-3-methyl-5-pyrazolone | Chromium | Red. |
| 13 | 2-aminophenol-5-sulphonamide | do | do | Red. |
| 14 | do | do | Cobalt | Orange. |
| 15 | 4-chloro-2-aminophenol | 1-(4'-β-hydroxyethylsulphonyl-phenyl)-3-methyl-5-pyrazolone | Chromium | Red. |
| 16 | 4-nitro-2-aminophenol | do | do | Orange. |
| 17 | 2-aminophenol-4-methylsulphone | do | do | Do. |
| 18 | 6-nitro-1-amino-2-naphthol-4-sulphonamide | do | do | Reddish-brown. |
| 19 | 2-aminophenol-5-sulphonamide | do | do | Red. |
| 20 | do | do | Cobalt | Orange. |
| 21 | 2-aminophenol-4-β-hydroxyethyl-sulphone | Acetoacet-p-chloranilide | do | Yellow. |
| 22 | do | Acetoacet-o-toluidide | do | Do. |
| 23 | do | Acetoacet-p-anisidide | do | Do. |
| 24 | do | Acetoacet-m-4-xylidide | do | Do. |
| 25 | do | 3-acetamido-p-cresol | Chromium | Brown. |
| 26 | do | 1-phenyl-3-methyl-5-pyrazolone | Cobalt | Reddish-yellow. |
| 27 | do | 1-(3'-chlorophenyl)-3-methyl-5-pyrazolone | do | Do. |
| 28 | do | do | Chromium | Orange. |

| Ex. | Amine | Coupling component | Metal | Shade obtained on woolen textile materials |
|---|---|---|---|---|
| 29 | 2-aminophenol-4-β-hydroxyethyl-sulphone | 1-(2'-chlorophenyl)-3-methyl-5-pyrazolone | Chromium | Orange. |
| 30 | ___do___ | ___do___ | Cobalt | Reddish-yellow. |
| 31 | ___do___ | 1-(2':5'-dichlorophenyl)-3-methyl-5-pyrazolone | ___do___ | Do. |
| 32 | ___do___ | ___do___ | Chromium | Orange. |
| 33 | ___do___ | 1-(3'-sulphamylphenyl)-3-methyl-5-pyrazolone | ___do___ | Do. |
| 34 | ___do___ | 1-(2'-methylphenyl)-3-methyl-5-pyrazolone | ___do___ | Do. |
| 35 | ___do___ | ___do___ | Cobalt | Reddish-yellow. |
| 36 | ___do___ | 1-(3'-methylphenyl)-3-methyl-5-pyrazolone | Chromium | Orange. |
| 37 | ___do___ | 1-(4'-methylphenyl)-3-methyl-5-pyrazolone | ___do___ | Do. |
| 38 | ___do___ | 1-(4'sulphamylphenyl)-3-methyl-5-pyrazolone | ___do___ | Do. |
| 39 | ___do___ | ___do___ | Cobalt | Reddish-yellow. |
| 40 | ___do___ | 1-(4'-sulphamylnaphthyl)-3-methyl-5-pyrazolone | ___do___ | Do. |
| 41 | ___do___ | ___do___ | Chromium | Orange. |
| 42 | ___do___ | 1-(2'-methoxyphenyl)-3-methyl-5-pyrazolone | ___do___ | Do. |
| 43 | ___do___ | 1-[3'-(N:N-dimethylsulphamyl(phenyl]-3-methyl-5-pyrazolone. | ___do___ | Do. |
| 44 | ___do___ | 1-[4'-(N-methylsulphamyl)phenyl]-3-methyl-5-pyrazolone. | ___do___ | Do. |
| 45 | ___do___ | 1-(3'-(N-methylsulphamyl)phenyl]-3-methyl-5-pyrazolone. | ___do___ | Do. |
| 46 | ___do___ | 1-[3' - (N - isopropylsulpamyl)phenyl] - 3 - methyl - 5 - pyrazolone. | ___do___ | Do. |
| 47 | ___do___ | 1-phenyl-5-pyrazolone-3-carboxy-cresidide | ___do___ | Red. |
| 48 | ___do___ | 1-phenyl-5-pyrazolone-3-carboxyanilide | ___do___ | Red. |
| 49 | ___do___ | 1-phenyl-5-pyrazolone-3-carboxy-2'toluidide | ___do___ | Red. |
| 50 | ___do___ | ___do___ | Cobalt | Orange. |
| 51 | ___do___ | β-Naphthol | ___do___ | Bordeaux. |
| 52 | ___do___ | ___do___ | Chromium | Brownish-violet. |
| 53 | ___do___ | 1-carbethoxyamino-7-naphthol | Cobalt | Reddish-blue. |
| 54 | ___do___ | 6-acetyl-2-naphthol | Chromium | Brownish-violet. |
| 55 | ___do___ | ___do___ | Cobalt | Bordeaux. |
| 56 | ___do___ | 1-carboisopropoxyamino-7-naphthol | Chromium | Grey. |
| 57 | ___do___ | 1-naphthol-5-sulphonamide | ___do___ | Violet. |
| 58 | ___do___ | ___do___ | Cobalt | Bordeaux. |
| 59 | ___do___ | 1-naphthol-3-sulphonamide | ___do___ | Bluish-bordeaux. |
| 60 | ___do___ | 1-naphthol-3-sulphonamide | Chromium | Violet. |
| 61 | ___do___ | 2-naphtol-6-sulphonamide | ___do___ | Do. |
| 62 | ___do___ | ___do___ | Cobalt | Yellowish-bordeaux. |
| 63 | ___do___ | 1-phenylamino-7-naphthol | Chromium | Dark green. |
| 64 | ___do___ | 5:8-dichloro-1-naphthol | ___do___ | Dark blue. |
| 65 | ___do___ | ___do___ | Cobalt | Bordeaux. |
| 66 | ___do___ | 2-naphthylamine-6-sulphonamide | Chromium | Brownish-grey. |
| 67 | ___do___ | 1-acetylamino-8-naphthol-3:6-disulphon-N:N-diethylamide. | ___do___ | Reddish-grey. |
| 68 | ___do___ | ___do___ | Cobalt | Reddish-violet. |
| 69 | ___do___ | 1 benzoylamino-7-naphthol | Chromium | Grey. |
| 70 | ___do___ | ___do___ | Cobalt | Violet. |
| 71 | ___do___ | 1-(3'-β-hydroxyethylsulphonylphenyl)-3-methyl-5-pyrazolone. | Chromium | Orange. |
| 72 | ___do___ | ___do___ | Cobalt | Reddish-yellow. |
| 73 | ___do___ | β-Tetralol | ___do___ | Reddish-brown |
| 74 | ___do___ | ___do___ | Chromium | Bluish-brown. |
| 75 | ___do___ | 3:4-dimethylphenol | ___do___ | Brown. |
| 76 | ___do___ | ___do___ | Cobalt | Red. |
| 77 | ___do___ | p-Cresol | Chromium | Brown. |
| 78 | ___do___ | 3-acetylamino-p-cresol | Cobalt | Reddish-brown. |
| 79 | ___do___ | 4-methoxy-3-acetylaminophenol | Chromium | Violet. |
| 80 | ___do___ | ___do___ | Cobalt | Do. |
| 81 | ___do___ | 4-methyl-3-acetylaminophenol | Chromium | Brown. |
| 82 | ___do___ | 2:4-dimethylphenol | ___do___ | Do. |
| 83 | ___do___ | 4-methoxyphenol | ___do___ | Bluish-violet. |
| 84 | ___do___ | Acetoacetanilide | ___do___ | Yellow. |
| 85 | ___do___ | ___do___ | Cobalt | Do. |
| 86 | ___do___ | Acetoacet-o-anisidide | ___do___ | Do. |
| 87 | ___do___ | 2:4-dihydroxyquinoline | Chromium | Red. |
| 88 | 2-aminophenol-4-sulphon-N-β-hydroxyethylamide | β-Naphthol | ___do___ | Brownish-violet. |
| 89 | ___do___ | ___do___ | Cobalt | Bordeaux. |
| 90 | ___do___ | 1-phenyl-3-methyl-5-pyrazolone | Chromium | Orange. |
| 91 | ___do___ | ___do___ | Cobalt | Reddish-yellow. |
| 92 | ___do___ | 1-carboethoxyamino-7-naphthol | Chromium | Grey. |
| 93 | ___do___ | 1-acetylamino-7-naphthol | ___do___ | Do. |
| 94 | ___do___ | 6-acetyl-2-naphthol | ___do___ | Violet. |
| 95 | ___do___ | ___do___ | Cobalt | Bordeaux. |
| 96 | ___do___ | 1-(3'-sulphamylphenyl)-3-methyl-5-pyrazolone | Chromium | Orange. |
| 97 | ___do___ | ___do___ | Cobalt | Reddish-yellow. |
| 98 | ___do___ | 6-(p-toluenesulphonylamino-sulphonyl)-2-naphthol | Chromium | Violet. |
| 99 | ___do___ | ___do___ | Cobalt | Bordeaux. |
| 100 | 2-aminopenol-4-sulphon-N:N-di(β-hydroxyethyl)amide | β-Naphthol | ___do___ | Do. |
| 101 | ___do___ | β-Naphthol | Chromium | Brownish-violet. |
| 102 | 2-aminophenol-4-sulphon-N-methyl-N-β-hydroxyethylamide | 1-acetylamino-7-naphthol | ___do___ | Grey. |
| 103 | Anthranilic acid | 1-(3'-β-hydroxyethylsulphonyl-phenyl)-3-methyl-5-pyrazolone | ___do___ | Yellow. |
| 104 | ___do___ | 1-(4'-β-hydroxyethylsulphonyl-phenyl)-3-methyl-5-pyrazolone | ___do___ | Do. |
| 105 | Anthranilic acid 4-methyl-sulphone | ___do___ | ___do___ | Do. |
| 106 | Anthranilic acid 4-sulphonamide | ___do___ | ___do___ | Do. |
| 107 | 5-nitro-2-aminophenol | ___do___ | ___do___ | Bordeaux. |
| 108 | Anthranilic acid-4-β-hydroxy-ethysulphone | 1-phenyl-3-methyl-5-pyrazolone | ___do___ | Yellow. |
| 109 | ___do___ | 1-(2'-methylphenyl)-3-methyl-5-pyrazolone | ___do___ | Do. |
| 110 | 4-methoxy-2-aminophenol | 2-naphthol-6-β-hydroxyethyl-sulphone | ___do___ | Reddish-grey. |
| 111 | 4-chloro-5-nitro-2-aminophenol | ___do___ | ___do___ | Reddish-blue. |
| 112 | 5-nitro-2-aminophenol | ___do___ | ___do___ | Grey. |
| 113 | 4-nitro-2-aminophenol | 2-naphthol-6-β-hydroxyethyl-sulphone | ___do___ | Brown-violet. |
| 114 | ___do___ | 1 - [3' - (N - phenyl - N - β - hydroxyethyl - sulphamyl)phenyl]-3-methyl-5-pyrazolone | ___do___ | Orange. |
| 115 | 2-aminophenol-5-sulphonamide | ___do___ | ___do___ | Yellowish-red. |
| 116 | 4-chloro-2-aminophenol | 2-naphthol-6-β-hydroxyethyl-sulphone | ___do___ | Violet. |
| 117 | 2-aminophenol-4-sulphonamide | ___do___ | Cobalt | Bordeaux. |
| 118 | 6 - nitro - 2 - aminophenol - 4 - sulphon - N - β - hydroxyethylamide | β-Naphthol | Chromium | Grey. |
| 119 | 2-aminophenol-5-β-hydroxy-ethylsulphone | 1-phenyl-3-methyl-5-pyrazolone | ___do___ | Reddish-orange. |
| 120 | 2-aminophenol-4-β-hydroxy-ethylsulphone | 1-phenyl-3-methyl-5-aminopyrazole | Cobalt | Orange. |
| 121 | ___do___ | 1-(2'-methylphenyl)-3-methyl-5-aminopyrazole | ___do___ | Do. |

Example 122

In place of the 12.5 parts of methanesulphonyl chloride used in Example 1 there are used 14.2 parts of ethanesulphonyl chloride whereby a dyestuff is obtained which has similar properties to the dyestuff of Example 1.

The following table gives further examples of the new dyestuffs of the invention which are obtained by the method described in Example 1 except that (a) the 43.7 parts of the metallised azo compound used in Example 1 are replaced by an equivalent amount of the metallised azo compound which is obtained by diazotising the amine listed in the second column of the table, coupling with the coupling component listed in the third column of the table and treating the azo compound so obtained with a metallising agent of the metal (chromium or cobalt) listed in the fourth column of the table and (b) the 12.5 parts of methane sulphonylchloride used in Example 1 are replaced by an equivalent amount of the sulphonyl chloride listed in the fifth column of the table. The sixth column of the table indicates the shade obtained when the dyestuff is applied to a woolen textile material.

dyestuff is then filtered off and dried. The dyestuff so obtained when applied to wool from a neutral or slightly acid dyebath yields brown shades which possess excellent fastness to washing, to milling and to light.

Example 135

In place of the 19.3 parts of the monoazo compound obtained by coupling 4-chlor-2-aminophenol with 1-carboethoxyamino-7-naphthol used in Example 134 there are used 24 parts of the monoazo compound obtained by coupling diazotised 2-aminophenol-4-β-hydroxyethyl sulphone with 2-naphthol-6-β-hydroxyethyl sulphone and in place of the 6.3 parts of methane sulphonyl chloride there are used 18.9 parts of methane sulphonyl chloride whereby a dyestuff is obtained which dyes wool from a neutral or slightly acid dyebath in brown shades which possess excellent fastness to washing, to milling and to light.

The 2-aminophenol-4-β-hydroxyethylsulphone used in the above examples may be obtained in the form of its hydrochloride by the following method:

A mixture of 220.5 parts of 1-chlorobenzene-4-β-hy-

| Ex. | Amine | Coupling Component | Metal | Sulphonyl chloride | Shade |
|---|---|---|---|---|---|
| 123 | 2-aminophenol-4-β-hydroxy-ethyl sulphone | 1-(3'methylphenyl)-3-methyl-5-pyrazolone | Chromium | Ethane sulphonylchloride | Orange. |
| 124 | ----do---- | 2-naphthol-6-sulphonamide | Cobalt | ----do---- | Bordeaux. |
| 125 | 2-aminophenol-4-sulphon-N-β-hydroxyethylamide | 1-phenyl-3-methyl-5-pyrazolone | Chromium | ----do---- | Orange. |
| 126 | ----do---- | 1-carboethoxyamino-7-naphthol | ----do---- | ----do---- | Grey. |
| 127 | 2-aminophenol-4-β-hydroxyethyl-sulphone | 1-phenyl-3-methyl-5-pyrazolone | ----do---- | β-Toluene sulphonyl chloride | Orange. |
| 128 | ----do---- | 1-acetylamino-7-naphthol | ----do---- | ----do---- | Grey. |
| 129 | 2-aminophenol-4-sulphon-N:N-di(β-hydroxyethyl)amide | β-Naphthol | ----do---- | ----do---- | Brownish-violet. |
| 130 | ----do---- | ----do---- | Cobalt | ----do---- | Bordeaux. |
| 131 | 2-aminophenol-4-β-hydroxy-ethyl sulphone | β-Tetralol | Chromium | Chloromethane sulphonly chloride | Brown. |
| 132 | ----do---- | 1-(2'-chlorophenyl)-3-methyl-5-pyrazolone | ----do---- | m-Nitrobenzene sulphonyl chloride | Orange. |

Example 133

Diazotised 2-aminophenol-4-β-hydroxyethylsulphone is coupled with 1-(2':5'-dichlorophenyl)-3-methyl-5-pyrazolone and the monoazo compound so obtained is heated with a solution of chromium acetate in a mixture of ethanol and water to yield the 1:2-chrome complex.

A mixture of 52.15 parts of the above chrome complex and 500 parts of toluene is stirred at the boil and 100 parts of toluene are allowed to distill off from the mixture. The mixture is then cooled to 10° C. and 50 parts of pyridine and 12.5 parts of methane sulphonyl chloride are added. The mixture so obtained is then stirred for 20 hours at a temperature between 5° and 10° C. and the precipitated dyestuff is then filtered off, washed with benzene and dried.

The dyestuff so obtained when applied to wool from a neutral or slightly acid dyebath yields orange shades possessing excellent fastness to wet treatments and to light.

Example 134

A mixture of 20.1 parts of the monoazo compound obtained by coupling diazotised 2-aminophenol-4-β-hydroxyethyl sulphone with 1-phenyl-3-methyl-5-pyrazolone, 19.3 parts of the monoazo compound obtained by coupling diazotised 4-chlor-2-aminophenol with 1-carboethoxyamino-7-naphthol, 500 parts of ethanol, 500 parts of ethylene glycol, 200 parts of water and 14.5 parts of chromium acetate is stirred at the boil under a reflux condenser for 16 hours. The solution so obtained is cooled to 20° C., 400 parts of a 10% aqueous solution of sodium chloride are added and the dyestuff which is precipitated is filtered off and dried.

A mixture of the above metallised compound, 6.3 parts of methane sulphonyl chloride and 400 parts of pyridine is stirred for 20 hours at a temperature between 10° and 15° C. The solution so obtained is then poured into a mixture of 400 parts of ice and 400 parts of water and 80 parts of sodium chloride are added. The precipitated droxyethylsulphone and 441 parts of sulphuric acid is stirred at a temperature between 20° and 25° C. for 15 hours. 73 parts of nitric acid (of specific gravity 1.5) are then slowly added during 2 to 3 hours, the temperature of the mixture being maintained between 20° and 25° C. by external cooling, and the mixture is then stirred for a further 15 hours at the same temperature. The mixture is then slowly added, with stirring, to 3500 parts of ice and water, sufficient ice being present to ensure that the temperature of the resulting mixture does not exceed 10° C. The mixture so obtained is then filtered, the filtrate is cooled to 5° C. and 400 parts of potassium chloride are added. The mixture is then stirred for 3 hours at a temperature of 5° C. and the potassium salt of 1-chloro-2-nitrobenzene-4-β-sulphatoethylsulphone which separates out is filtered off and washed with a saturated aqueous solution of potassium chloride.

A mixture of 167 parts of the above potassium salt and 1700 parts of a 4.5% aqueous solution of sodium hydroxide is stirred at the boil under a reflux condenser for 6 hours. The solution is then cooled to 20° C., a concentrated aqueous solution of hydrochloric acid is added until the mixture is acid to Congo red and the 2-nitrophenol-4-β-hydroxyethylsulphone which separates out is filtered off, washed with water and dried.

123.5 parts of the 2-nitrophenol-4-β-hydroxyethylsulphone are slowly added to a mixture of 150 parts of iron powder, 10 parts of acetic acid and 750 parts of water which is stirred at the boil under a reflux condenser and the mixture so obtained is then stirred for a further 4 hours at the boil. 97 parts of a 32% aqueous solution of sodium hydroxide are then added and the mixture is filtered. 200 parts of a concentrated aqueous solution of hydrochloric acid are added to the filtrate and the mixture so obtained is cooled to 15° C. when the hydrochloride of 2-aminophenol-4-β-hydroxyethyl sulphone crystallises out and is filtered off and dried.

The 2-naphthol-6-β-hydroxyethylsulphone used in the above examples may be obtained by treating 2-naphthol-6-sulphonic acid with p-toluene sulphonchloride in aqueous medium, converting the resulting 2-p-toluenesulphonyloxynaphthalene-6-sulphonic acid to the corresponding sulphonchloride by treatment with phosphorus oxychloride, reducing the sulphonchloride to the sulphinic acid, with an aqueous solution of sodium sulphite, treating the sulphinic acid with ethylenechlorohydrin in aqueous medium in the presence of sodium carbonate, and finally heating with an aqueous solution of sodium carbonate to hydrolyse off the p-toluenesulphonyl group.

The anthranilic acid 4-β-hydroxyethylsulphone used in the above examples may be obtained by reacting p-toluenesulphinic acid with ethylenechlorohydrin in aqueous medium in the presence of sodium carbonate, nitrating the resulting p-toluene-β-hydroxyethylsulphone, oxidising the resulting 3-nitro-4-methylbenzene β-hydroxyethyl sulphone with an aqueous solution of potassium permanganate to yield 3-nitro-4-carboxybenzene β-hydroxyethylsulphone and finally reducing the nitro group to an amino group by an aqueous iron reduction.

The 2-aminophenol-5-β-hydroxyethylsulphone used in the above examples may be obtained by treating 2-aminophenol with phosgene, reacting the resulting benzisoxazolone with chlorosulphonic acid to form the sulphonyl-chloride, treating with an aqueous solution of sodium sulphite to form the sulphinic acid, condensing with ethylene chlorohydrin in aqueous medium in the presence of sodium carbonate and finally heating with a dilute aqueous solution of sodium hydroxide.

The 1-(3'- or 4'-β-hydroxyethylsulphonylphenyl)-3-meth-5-pyrazolones used in the above examples may be obtained from 3'-β-hydroxyethylsulphonylaniline and 4'-β-hydroxyethylsulphonylaniline respectively by diazotising, reducing to form the hydrazine and subsequently condensing with ethylacetoacetate in the presence of sodium hydroxide.

What we claim is:

Metallized azo dyestuffs which are represented by the formula:

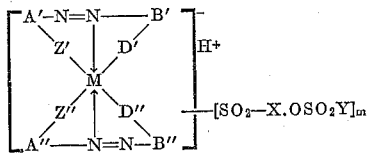

wherein:

A' and A" respectively stand for a member selected from the group consisting of phenylene and naphthylene radicals;

B' and B" respectively stand for a coupling component selected from the class consisting of phenols, naphthols, acylacetarylamides, 5-aminopyrazoles, 5-pyrazolones, and 2:4-dihydroxyquinoline;

and any substituents on the radicals A', A", B', and B" are selected from the class consisting of lower alkyl, lower alkoxy, chlorine, bromine, nitro, lower alkyl sulfonyl, acetylamino, propionylamino, benzoylamino, carbomethoxyamino, carboethoxyamino, carboisopropylamino, sulfamyl, N:N-dimethylsulfamyl, N-ethylsulfamyl, N-benzoylsulfamyl, N-phenylsulfamyl, N-methylsulfamyl, N-isopropylsulfamyl, N:N-diethylsulfamyl, acetyle, and phenylamino;

Z' and Z" respectively stand for a member selected from the class consisting of —O— and —COO—;

D' and D" respectively stand for a member selected from the group consisting of —O— and —NH—;

M is a metal selected from the group consisting of chromium and cobalt ions;

X is an alkylene radical having from 1 to 6 carbon atoms;

Y is a member selected from the class consisting of lower alkyl, chloro lower alkyl, phenyl, tolyl, chlorophenyl, methoxyphenyl, and nitrophenyl;

$m$ is one of the numbers 1, 2, 3, and 4;

each —SO$_2$—X—OSO$_2$Y group is attached directly to a carbon atom of one of A', A", B', and B".

References Cited in the file of this patent
UNITED STATES PATENTS
2,826,572    Kuster et al. _____ Mar. 11, 1958
FOREIGN PATENTS
1,002,099    Germany _____ Feb. 7, 1957
OTHER REFERENCES
Wegmann, "Textil-Praxis," October 1958, pages 1056–1058, 260–144. (Copy available in Scientific Library.)